United States Patent Office 2,698,722
Patented Jan. 4, 1955

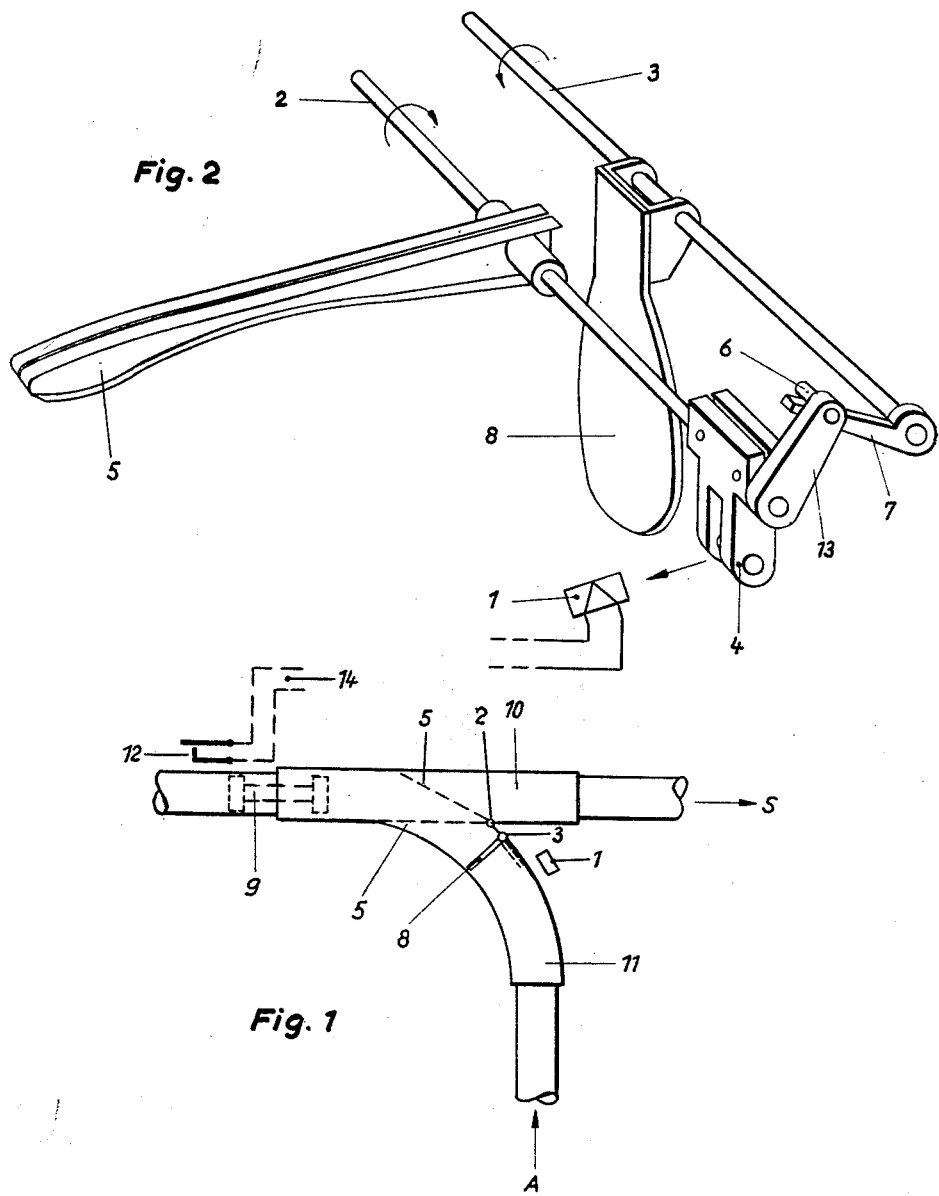

2,698,722
PNEUMATIC TUBE SYSTEM

Rudolf Haberkorn, Berlin-Lichterfelde Sud, Germany, assignor to International Standard Electric Corporation, New York, N. Y., a corporation of Delaware Application May 17, 1952, Serial No. 288,515
Claims priority, application Germany May 17, 1951

3 Claims. (Cl. 243—31)

The present invention relates to improvements in communication systems of the pneumatic tube type, and more particularly to control means at the discharge station of a message carrier dispatched through such a pneumatic tube system.

Carriers containing messages or small objects are transported in communication systems of the above type through tubes by means of differences in air pressure. Switching or deflecting means, usually controlled by electromagnets, are provided to guide the carriers from one tube line to another. In such systems, the tube branch leading to a discharge station must be provided with an air control or regulating valve to prevent the air pressure in the system to be adversely affected due to the inrushing atmospheric air at the discharge point when the carrier leaves the system.

Heretofore, the air regulating valve was pneumatically controlled in such manner that the pressure of air in the system and in the atmosphere was equalized when the deflecting means was operated to direct the carrier into the branch line leading to the discharge station, the carrier impinging upon and deflecting the flap or damper of the air control valve as it left the system. Although the pressure equalization caused a reduction of the discharge velocity of the carrier, the impact of the carrier upon the damper resulted in considerable and unpleasant noise. Furthermore, this impact subjected the damper to considerable wear, reducing the useful life of the damper.

It is the principal object of the present invention to provide novel means for controlling and guiding carriers at the discharge station of a pneumatic tube system in such manner that the above disadvantages are avoided.

The above object is accomplished in accordance with this invention by providing means for synchronously operating the carrier deflecting means and the air regulating valve damper, preferably by electromagnetic means. Thus, the damper is automatically moved out of the path of the carrier when the latter reaches the discharge point so that the carrier is ejected with decreased velocity without hitting the damper. This causes substantially noiseless ejection of the carrier from the system.

In accordance with a preferred embodiment of the invention, the carrier deflecting means and the air regulating damper are coordinated in their operation by providing a lever on the axle of the deflector and a lever on the axle of the damper, the two levers being arranged to cooperate in such a manner that rotation of the deflector axle will result in rotation of the damper axle.

The above objects, features and advantages of the present invention will be more fully described in conjunction with the accompanying drawing showing a preferred embodiment of the invention and wherein Fig. 1 is a schematic top view of a discharge station showing the carrier deflector and the air regulating damper; and Fig. 2 is a perspective view of the deflector and damper with control links according to the invention.

Referring now to the drawing, wherein like reference numerals indicate like parts, there is shown a deflector blade 5 mounted fixedly on axle 2 at the intersection of tubes 10 and 11. As shown in Fig. 1, in broken lines, deflector 5 is rotatable on axle 2 into two positions, either to close off branch tube 11, or to guide carrier 9 into said branch line by closing tube 10. Air regulating damper 8 is mounted on axle 3 in branch line 11 and is normally held in a position transverse to the line by atmospheric pressure A entering the tube from the outside. Deflector 5 and damper 8 are controlled by electromagnet 1. At the incoming end of tube 10 there is provided a switch 12 which is actuated in a manner known per se when carrier 9 passes by. Arrow S indicates the direction of suction.

The automatic control means will now be more fully explained in connection with Fig. 2. Deflector 5 is carried by axle 2 which is provided at one end with coupling link 4 arranged to be actuated by electromagnet or solenoid 1. Lever 13 is mounted on coupling link 4 and makes operative contact with lever 7 by means of pin 6. Lever 7 is integral with axle 3 which carries the damper 8.

The automatic control of the deflector and damper operates as follows:

Upon passing contact 12, the carrier 9 actuates the contact and thereby activates solenoid 1 over line 14 which includes a suitable source of power (not shown). The solenoid thereupon attracts coupling link 4 and rotates axle 2 in clockwise direction, thereby turning deflector 5 in a position to close tube 10 and to guide the carrier into branch line 11. Rotation of axle 2 results in movement of levers 13 and 7 which, as shown in Fig. 2, causes axle 3 to rotate counter-clockwise and to move the damper 8 out of the path of the carrier (see position indicated in broken lines in Fig. 1). Thus, the damper 8 is opened before the carrier reaches it and is not exposed to impact, wear and operational noise.

I claim:

1. In a pneumatic tube system for dispatching carriers through a tube to a discharge station comprising another tube branching off from the first-named tube, pivotable carrier deflecting means arranged to guide the carrier through the first-named tube when in one position and through the other tube when in another position, and a pivotable air regulating damper arranged in the other tube, said deflecting means and said damper adapted to pivot in opposite directions when operated; means including a mechanical linkage for synchronously controlling the pivoting movement of the deflecting means and the damper.

2. In a pneumatic tube system for dispatching carriers through a tube to a discharge station comprising another tube branching off from the first-mentioned tube, a pivotable carrier deflecting member arranged to guide the carrier through the first-named tube when in one position and through the other tube when in another position, and a pivotable air regulating damper arranged in the other tube, the carrier deflecting member and the damper being fixedly mounted on respective axles, said axles adapted to pivot in opposite directions: a lever fixedly mounted on the axle carrying the deflecting member, another lever fixedly mounted on the axle carrying the damper, a fulcrum joining the two levers, whereby rotation of an axle in a first direction will result in rotation of the other axle in an opposite direction, and electromagnetic means arranged to cause rotation of the axle carrying the deflecting member.

3. In a pneumatic tube system for dispatching carriers through a tube to a discharge station comprising another tube branching off from the first-mentioned tube, a pivotable carrier deflector arranged to guide the carrier through the first-named tube when in one position and through the other tube when in another position, and a pivotable air regulating damper arranged in the other tube, the carrier deflector and the damper being fixedly mounted on respective axles, said axles adapted to pivot in opposite directions: a coupling member fixedly mounted on the axle carrying the deflector, electromagnetic means arranged to attract said coupling member whereby its associated axle is rotated and the deflector is pivoted into said other position, a lever fixedly mounted on the axle carrying the deflector, another lever fixedly mounted on the axle carrying the damper, and a fulcrum joining the two levers whereby the axle carrying the damper is rotated upon rotation of the first-mentioned axle and in a direction opposite thereto.

References Cited in the file of this patent

UNITED STATES PATENTS

| Number | Name | Date |
|---|---|---|
| 279,574 | Leaycraft | June 19, 1883 |
| 727,138 | Hert | May 5, 1903 |
| 730,715 | Steinbock | June 9, 1903 |
| 747,724 | Jordan | Dec. 22, 1903 |
| 1,316,077 | Black | Sept. 16, 1919 |